United States Patent [19]
Cork

[11] Patent Number: 5,620,770
[45] Date of Patent: Apr. 15, 1997

[54] FIFTH WHEEL INSERT, LAMINATE COMPOSITE AND METHOD OF CONSTRUCTION

[75] Inventor: Michael S. Cork, Richardson, Tex.

[73] Assignee: Superior Environmental Products, Inc., Addison, Tex.

[21] Appl. No.: 458,029

[22] Filed: Jun. 1, 1995

[51] Int. Cl.$^6$ .............................. B32B 3/02; B62D 53/08
[52] U.S. Cl. ...................... 428/121; 280/423.1; 280/433; 280/439; 428/323; 428/331; 428/359; 428/469
[58] Field of Search ..................... 428/121, 323, 428/331, 359, 461; 280/433, 439, 423.1

[56] References Cited

U.S. PATENT DOCUMENTS

| | | | |
|---|---|---|---|
| 3,174,812 | 3/1965 | Widmer | 308/136 |
| 3,337,277 | 8/1967 | Arnold | 308/136 |
| 4,169,635 | 10/1979 | Szalay et al. | 308/136 |
| 4,542,912 | 9/1985 | St. Louis | 280/433 |
| 4,615,853 | 10/1986 | Aoyama | 264/122 |
| 4,752,081 | 6/1988 | Reeners | 280/433 |
| 4,946,184 | 8/1990 | Larocco | 280/433 |
| 5,066,035 | 11/1991 | Athans et al. | 280/441.1 |

Primary Examiner—Nasser Ahmad
Attorney, Agent, or Firm—John M. Harrison

[57] ABSTRACT

A fifth wheel insert, laminate composite and method of construction, which insert includes a cap or cover having mount tabs for tack-welding the insert on a fifth wheel. The laminate composite includes a composite of ultra-high molecular weight polyethylene resin and one or more modulus of elasticity modifier such as carbon fibers and is designed to be secured to the fifth wheel of a tractor, the coupling plate of a trailer or to the insert mounted on the fifth wheel, in order to reduce friction and eliminate the need for greasing the fifth wheel-trailer coupling. In a preferred embodiment the laminate composite is constructed by mixing ultra-high molecular weight polyethylene powder and carbon fibers, applying heat and pressure to the mixture to produce a sheet of composite material having superior cold-flowing, lubricity and modulus of elasticity characteristics, preparing the surface of the fifth wheel, coupling plate or fifth wheel insert to receive the laminate composite, preparing the laminate composite surface to bond with the fifth wheel or insert and cementing the sheet laminate composite to the fifth wheel or the insert.

9 Claims, 2 Drawing Sheets

FIFTH WHEEL INSERT, LAMINATE COMPOSITE AND METHOD OF CONSTRUCTION

BACKGROUND OF THE INVENTION

1. Field of the Invention

This invention relates to fifth wheels in tractor-trailer vehicles and more particularly, to a cap, cover or insert for fitting over and tack-welding to the fifth wheel and an ultra high molecular weight (UHMW) polyethylene ingredient and elasticity modifying component combined to define a laminate composite and a method of constructing the composite. The laminate composite is applied to the bearing surface of a fifth wheel, trailer coupling plate or to the insert attached to the fifth wheel for reducing friction in the tractor-trailer coupling. In a preferred embodiment the insert is fitted with downwardly-extending tabs for tack-welding to the fifth wheel and the laminate composite is constructed of a mixture of ultra-high molecular weight polyethylene and a modulus of elasticity modifier such as carbon fibers to define a sheet material which is bonded to the fifth wheel or the fifth wheel insert to receive the trailer coupling plate. The laminate composite is characterized by superior toughness, wear-resistance, cold-flowing properties, modulus of elasticity and lubricity and is constructed by mixing ultra-high molecular weight polyethylene powder and an elasticity modifying component such as carbon fibers, applying heat and pressure to the mixture and producing the composite sheet.

Semi-trailers are traditionally and conventionally coupled to truck tractors by a coupling device which is known as a "fifth wheel". The fifth wheel includes a substantially round, flat, slotted plate positioned in a substantially horizontal plane on the truck tractor to define a bearing surface for attaching a corresponding coupling plate mounted on the trailer. The semi-trailer also includes a kingpin extending downwardly to locate and seat within the slot in the fifth wheel of the tractor. Once coupled, the trailer is allowed to pivot with respect to the tractor about the kingpin, with the trailer mounting surface or coupling plate bearing on the fifth wheel to permit the tractor and trailer to articulate when the tractor is turning. Grease applied to the fifth wheel normally serves to minimize friction and heat in the fifth wheel, but the grease cannot eliminate damage due to point and line stresses resulting from friction and rapid heat build-up when the trailer coupling plate momentarily bears on the fifth wheel in a non-uniform manner, a phenomenon which melts the grease, allows metal-to-metal contact under severe pressure and frequently causes damage to the fifth wheel and trailer coupling plate. Accordingly, it is difficult to maintain a uniform layer of grease between the two bearing surfaces joining the trailer and the tractor. Consequently, the grease must be frequently replaced, as it also tends to attract dirt and dust while the vehicle is on the road. Furthermore, as the grease is slowly eliminated from the trailer-tractor coupling due to friction and heat resulting from coupling articulation, the handling and performance characteristics of the rig tend to deteriorate and dangerous over-steering is a potential problem.

2. Description of the Prior Art

Various fifth wheel designs and techniques have been used to improve the bearing performance in the fifth-wheel trailer-tractor coupling. U.S. Pat. No. 5,066,035, dated Nov. 19, 1991, to Athans, et al, details a "Trailer Bearing Plate For Fifth Wheel". The device includes an assembly for coupling a tractor to a trailer, which assembly includes a fifth wheel bearing plate and a trailer bearing plate combination. A trailer bearing plate assembly includes a ring having a collar and is adapted to securely attach to an underside of the trailer. The trailer bearing plate further includes a disc disposed between the collar and the underside of the trailer. U.S. Pat. No. 3,174,812, dated Mar. 23, 1965, to M. Widmer, details a "Fifth Wheel Construction" for coupling an over-the-road truck tractor to a semi-trailer. The trailer plate assembly includes a ring having a collar adapted to securely attach to a trailer bearing plate housing. The housing is then secured to the underside of a trailer and the trailer bearing plate assembly further includes a disc disposed between the collar and the inner surface of the trailer plate housing. U.S. Pat. No. 4,169,635, dated Oct. 2, 1979, to Szalay, et al, details a fifth wheel bearing plate cover composed of a flat, sheet plastic material having a low coefficient of friction and high deflection characteristics, to provide a wear-resistant, slippery surface for contact with another bearing surface. A "Tractor Fifth Wheel Bearing Attachment" is detailed in U.S. Pat. No. 4,542,912, dated Sep. 24, 1985, to Andre. The attachment includes an anti-friction polyolefin plastic sheet mounted on the fifth wheel of a trailer.

It is an object of this invention to provide a new and improved fifth wheel cap, cover or insert for mounting on a fifth wheel and a laminate composite for attaching to a fifth wheel or to the fifth wheel cap, cover or insert, which composite includes high molecular weight polyethylene and a modulus of elasticity modifier and is designed to drastically reduce friction in the tractor-trailer coupling mechanism.

Another object of the invention is to provide a new and improved fifth wheel insert having tabs for tack-welding the insert in position on the fifth wheel and a high molecular weight polyethylene-elasticity modifier laminate composite and method of constructing the laminate composite, which laminate composite is designed to mount on the fifth wheel, trailer coupling plate or fifth wheel insert attached to the fifth wheel, to reduce friction between the trailer coupling plate and the fifth wheel or fifth wheel insert. In a preferred embodiment the laminate composite is constructed by mixing ultra-high molecular weight polyethylene resin with carbon fibers or other modulus of elasticity-modifying fibrous material, applying pressure to the mixture, producing a sheet of the composite of selected thickness, preparing the fifth wheel, trailer coupling plate or fifth wheel insert for bonding to the composite, preparing the sheet composite for bonding to the fifth wheel, trailer coupling plate or insert and bonding the laminate composite to the fifth wheel, trailer coupling plate or the fifth wheel insert by means of a suitable adhesive such as a urethane or an epoxy.

SUMMARY OF THE INVENTION

These and other objects of the invention are provided in a fifth wheel cover or insert shaped to mount on a fifth wheel and having downwardly-extending tabs for welding to the fifth wheel, and a laminate composite and method of construction, which laminate composite typically includes an ultra-high molecular weight polyethylene and carbon fiber sheet molded to a selected thickness for mounting on the fifth wheel, trailer coupling plate or fifth wheel insert. In a preferred embodiment the fifth wheel laminate composite is constructed by mixing ultra-high molecular weight polyethylene powder with a modulus of elasticity modifying carbon fibers in a suitable mold or tray, applying heat and pressure to the mixture to produce a sheet of laminate composite of selected thickness, preparing the metal surface of the fifth wheel, trailer coupling plate or insert by etching, sand blasting or other suitable process, preparing the laminate composite by a suitable process such as abrading and flame or plasma treatment for bonding with the fifth wheel, trailer coupling plate or fifth wheel insert and bonding the laminate composite to the fifth wheel, trailer coupling plate or fifth wheel insert using a suitable elastomeric or non-elastomeric adhesive such as urethane, epoxy or the like.

BRIEF DESCRIPTION OF THE DRAWINGS

The invention will be better understood by reference to the accompanying drawing, wherein.

DESCRIPTION OF THE PREFERRED EMBODIMENTS

Figure 1:
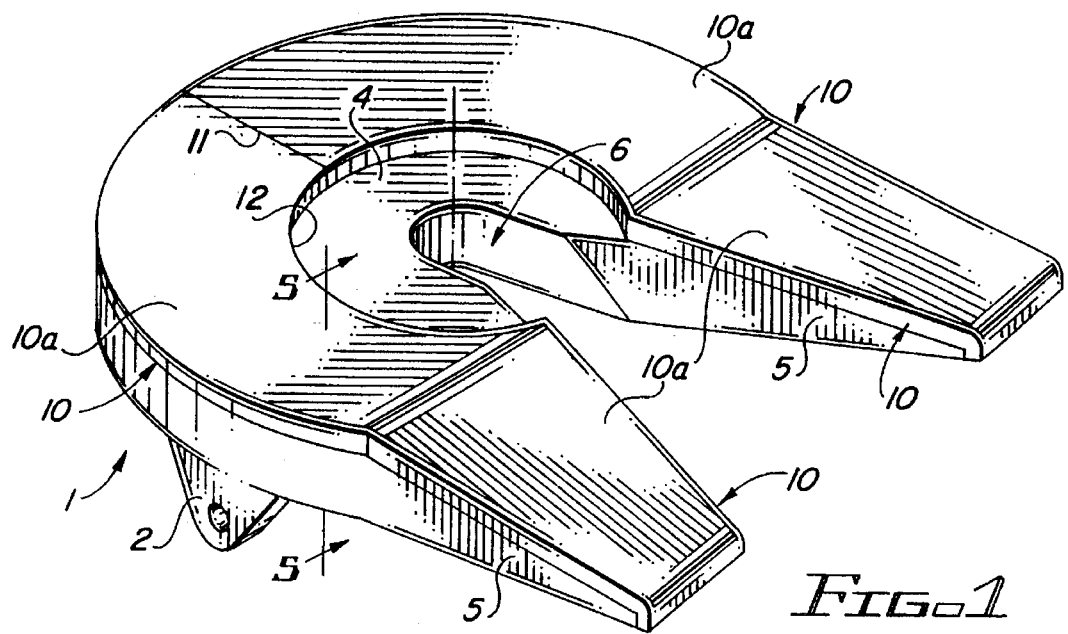
FIG. 1 is a perspective view of a conventional fifth wheel fitted with a preferred laminate composite of this invention.

Referring initially to FIG. 1 of the drawing, in a preferred embodiment of the invention a laminate composite plate 10 is bonded or attached to the bearing surface of the underlying conventional fifth wheel 1, typically mounted on a truck tractor (not illustrated), by means of a pair of conventional fifth wheel mount brackets 2. The fifth wheel 1 includes a smooth table top 4, with a pair of ramps 5 extending from the table top 4 to define a king pin slot 6. A conventional pin locking mechanism (not illustrated) is located in the kingpin slot 6 for receiving the kingpin (not illustrated) and locking or coupling plate (not illustrated) of a trailer (not illustrated) to secure the trailer to the tractor in conventional articulating relationship. In a most preferred embodiment of the invention the laminate composite plate 10 is shaped to define a curved plate clearance 12 and a plate margin 11 which defines the line of abutment of a pair of composite plate segments 10a, each secured to the fifth wheel 1 at the table top 4. Alternatively, it will be understood by those skilled in the art that the laminate composite plate 10 can be constructed in a sufficiently wide panel or plate to mount in one piece on the table top 4 of the fifth wheel 1 and eliminate the plate margin 11, as desired.

Figure 2:
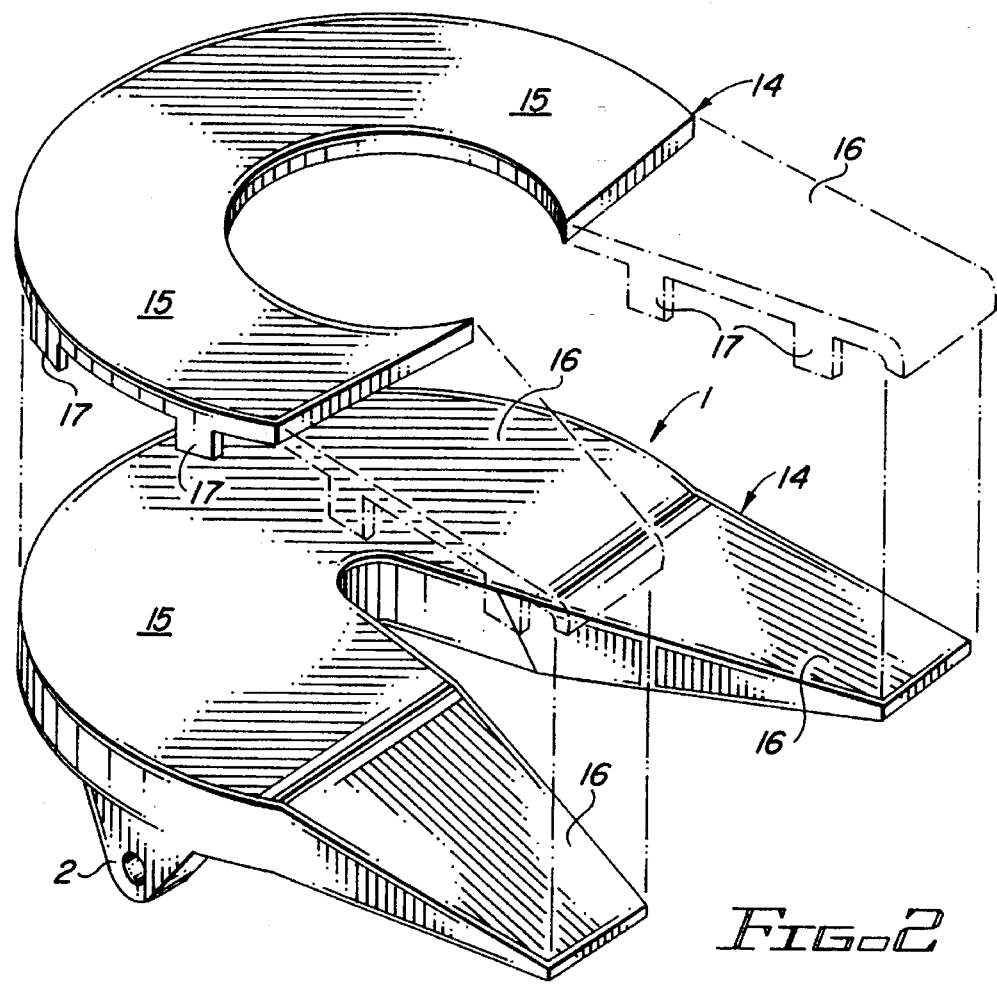
FIG. 2 is an exploded view of a cover or insert for mounting on a fifth wheel.

Referring now to FIG. 2 of the drawing, in another preferred embodiment of the invention the laminate composite plate 10 illustrated in FIG. 1 may be applied to an underlying cover or insert 14 which is, in turn, tack-welded, bolted or otherwise attached to the fifth wheel 1 illustrated in FIG. 1. The insert 14 conforms substantially to the configuration of the fifth wheel 1 and includes an insert table top 15 and a pair of optional insert ramps 16, illustrated in phantom, that conform to the table top 4 and ramps 5, respectively, of the fifth wheel 1. In a most preferred embodiment of the invention the insert 14 is mounted on the fifth wheel 1 by means of insert mount tabs 17, which are tack-welded to the sides of the fifth wheel 1, for easy removal.

Figure 3:
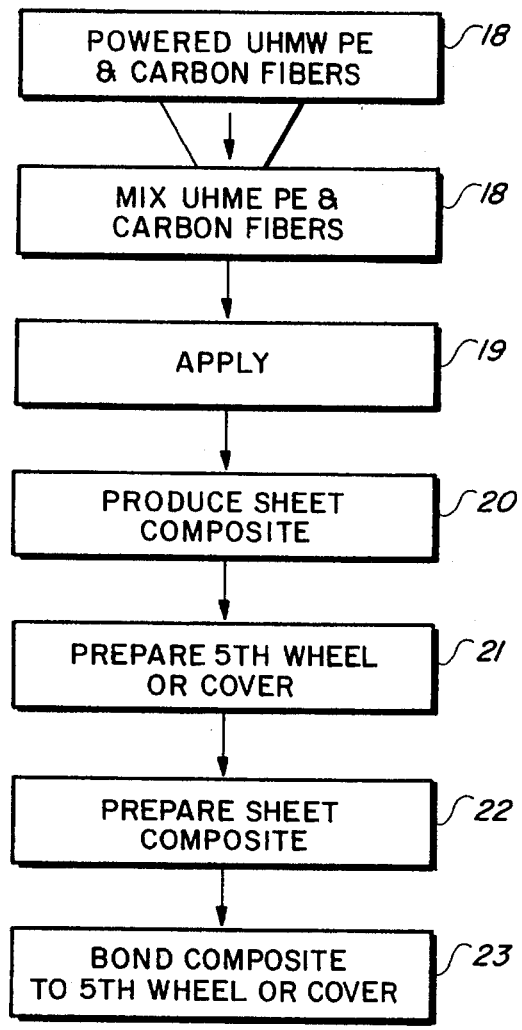
FIG. 3 is a block diagram illustrating a preferred process for constructing the laminate composite illustrated in FIG. 1.
Figures 4, 5:
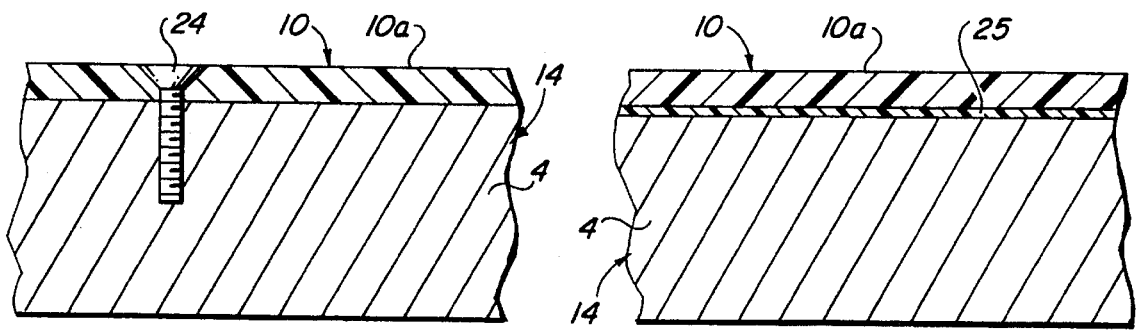
FIG. 4 is a sectional view of the laminate composite and fifth wheel or fifth wheel insert, more particularly illustrating a technique for bolting the laminate composite to the underlying fifth wheel or fifth wheel insert.
FIG. 5 is a sectional view of the laminate and fifth wheel taken along line 5—5 in FIG. 1, more particularly illustrating gluing or bonding the laminate composite to the underlying fifth wheel.

Referring to FIG. 3 of the drawing, in a preferred embodiment of the invention the laminated composite plate 10 is constructed by initially mixing powdered ultra-high molecular weight polyethylene resin and a modulus of elasticity modifying and friction-reducing material such as carbon fibers in a suitable mold or tray, as represented in blocks 18. Pressure and heat are then applied to the mixture as illustrated in block 19 to produce a sheet of the laminate composite plate 10 or the composite plate segments 10a of selected thickness, ranging from about 60 mils to about one-half inch and typically 120 mils, as illustrated in block 20. The table top 4 and top surface of the ramps 5 of the fifth wheel 1 illustrated in FIG. 1 or the corresponding insert table top 15 and, optionally, the insert ramps 16, if fabricated, illustrated in FIG. 2, are then prepared for bonding with the laminate composite plate 10 or composite plate segments 10a by etching, sand blasting, or other techniques known to those skilled in the art in order to prepare and "energize" the bonding surfaces, as illustrated in block 21. The bonding surface of the laminate composite plate 10 is also prepared for bonding to the top surface of the fifth wheel 1 or insert 14 by abrading the bonding surface with an abrasive tool or material such as sandpaper and then applying a flame or plasma treatment, or with a reactive gas such as fluorine and nitrogen mixture, or otherwise, as desired and as illustrated in block 22. The composite plate segments 10a of the laminate composite plates 10 are then bonded to the treated top surface of the fifth wheel 1 or insert 14 and joined at the plate margin 11 using an elastomeric cement such as urethane, rubberized epoxy or the like, as illustrated in FIGS. 1 and 5 and block 23 of FIG. 3. Alternatively, a non-elastomeric cement such as epoxy or methacryalate can be used to effect the bonding. The same process can be used to bond the laminate composite plates 10a or a laminate composite plate to the insert 14, as illustrated in FIG. 2, as well as to the trailer coupling plate (not illustrated) itself. Under circumstances where the laminate composite plate 10 or composite plate segments 10 are bonded to the insert 14, the insert 14 is first fitted over the fifth wheel 1 with the insert mount tabs 17 lying adjacent to the sides of the fifth wheel 1, where they are tack-welded in place, to facilitate a fast, convenient, yet easily removed, retrofit.

It will be appreciated by those skilled in the art that modulus of elasticity modifying fibers other than carbon fibers may be mixed with the powdered ultra-high molecular weight polyethylene resin to achieve the desired reduction of friction, lubricity and elasticity in the laminated composite plate 10 and composite plate segments 10a. For example, such aramid fibers as "KEVLAR" (trademark), as well as boron nitride, or silicon carbide fibers and like modulus of elasticity modifiers may also be used. However, in a most preferred embodiment of the invention, carbon fibers having an average length of from about 0.5 to about 8.0 millimeters and preferably, about 6.35 millimeters, are mixed with the powdered ultra-high molecular weight (UHMW) polyethylene resin in a weight ratio of about 18% carbon fibers to 82% (UHMW) polyethylene powder, to produce the laminate composite plate 10 or composite plate segments 10a. A typical molecular weight range for the ultra-high molecular weight polyethylene is from about one million to about nine million and preferably, about three million to about six million. An optimum UHMW polyethylene resin composition according to ASTM test no. 4020 is that composition having an internal viscosity of from about 10 to about 50 and preferably, from about 20 to about 40.

It will be further appreciated by those skilled in the art that the laminate composite plate 10 or composite plate segments 10a may be bolted to the table top 4 and the ramps 5 of the fifth wheel 1, the trailer coupling plate (not illustrated) or to the insert table top 15 and or the optional insert ramps 16 of the insert 14 using bolts 24, as illustrated in FIG. 4. However, in a most preferred embodiment of the invention the laminate composite plate 10 or composite plate segments 10a are bonded to the fifth wheel 1, coupling plate or insert 14 using a suitable adhesive 25, as illustrated in FIG. 5.

It will also be appreciated by those skilled in the art that the fifth wheel 1 and the insert 14 may be constructed of any desired metal, including steel and aluminum, in non-exclusive particular, and may be pressed or cast as the load-bearing base upon which the laminate composite plate 10 or composite plate segments 10a are bonded or attached. In a most preferred embodiment of the invention the laminate composite plate 10 or composite plate segments 10a are bonded to a steel fifth wheel 1, or to a steel insert 14 which is retrofitted over the fifth wheel 1, according to the procedure outlined above. Since the insert 14 is fitted with multiple, downwardly-extending mount tabs that can be quickly, easily and securely, yet removably, welded to the sides of the fifth wheel 1, the insert 14 can be easily retrofitted to and removed from the fifth wheel 1 without the necessity of removing the fifth wheel 1 from the tractor. It will be appreciated by those skilled in the art that the production of a laminate composite plate 10 or composite plate segments 10a by mixing ultra-high molecular weight polyethylene resin and a modulus of elasticity modifier and reinforcing agent such as carbon fibers, produces a friction-reducing plate or plates of controlled lubricity, superior cold-flowing characteristics, good modulus of elasticity, wear resistance, toughness and resiliency. The product offers high resistance to point and line load cracking and other deterioration due to uneven matching and alignment of the trailer coupling plate with the fifth wheel, resulting from tractor and trailer articulation when traversing the road crown or other road irregularities. Accordingly, the laminate composite plate 10 and composite plate segments 10a serve to minimize point or line loading and the accompanying friction and high heat build-up and undesirable damage to the fifth wheel and trailer coupling plate bearing surfaces.

In another preferred application of the laminate composite plate 10 of this invention, a sheet or sheets of the laminate composite 10 are placed in the beds of dump trucks to facilitate reduction of friction in the dumping of loads of dirt, trash and other materials from the dump trucks. Accordingly, under circumstances where the laminate composite plate 10 is used in at least the rear one-fourth to one-half of the dump truck bed, the dump truck must be lifted to a less acute angle and requires minimal "bed bounce" to facilitate sliding of the dirt or other load from the dump truck, resulting in a considerable savings of time and reduction in residual load which must be returned to the loading site. Other applications can be envisioned under circumstances where it is desired to bond the ultra-high molecular weight-polyethylene-elasticity modifying element in plate form to a metal surface for friction-reducing purposes.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A laminate composite bonded to a fifth wheel insert having a plurality of weld tabs for welding to a fifth wheel, said laminate composite comprising a sheet composite of polyethylene and a sufficient quantity of a component selected from the group consisting of carbon fibers, aramid fibers, boron nitride fibers and silicone carbide fibers to modify the modulus of elasticity of said polyethylene.

2. The laminate composite of claim 1 wherein said component comprises carbon fibers.

3. The laminate composite of claim 1 wherein said component comprises carbon fibers having an average length of from about 0.5 to about 8.0 millimeters.

4. The laminate composite of claim 3 wherein said carbon fibers have an average length of about 6.35 millimeters.

5. The laminate composite of claim 1 wherein said polyethylene and said component are provided in said sheet composite in a weight percent of about 82 percent and about 18 percent, respectively.

6. The laminate composite of claim 5 wherein said component comprises carbon fibers.

7. The laminate composite of claim 6 wherein said carbon fibers have an average length of from about 0.5 to about 8.0 millimeters.

8. The laminate composite of claim 1 wherein said sheet composite has a thickness of from about 60 mils to about one-half inch.

9. The laminate composite of claim 8 wherein said component comprises carbon fibers having an average length of from about 0.5 to about 8.0 millimeters.

\* \* \* \* \*